United States Patent
Decker et al.

(10) Patent No.: US 9,467,657 B2
(45) Date of Patent: *Oct. 11, 2016

(54) DYNAMIC ADAPTION OF A CONTINUOUS PRESENCE VIDEOCONFERENCING LAYOUT BASED ON VIDEO CONTENT

(71) Applicant: Polycom, Inc., San Jose, CA (US)

(72) Inventors: Eran Decker, Givataeeim (IL); Niv Wagner, Rechovot (IL); Avihay Barazany, Ashdod (IL); Roni Vistuch, Petach-Tikva (IL)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,245

(22) Filed: Feb. 22, 2016

(65) Prior Publication Data

US 2016/0173824 A1 Jun. 16, 2016

Related U.S. Application Data

(63) Continuation of application No. 13/857,746, filed on Apr. 5, 2013, now Pat. No. 9,294,726, which is a continuation of application No. 12/683,806, filed on Jan. 7, 2010, now Pat. No. 8,446,454, which is a continuation-in-part of application No. 11/751,558, filed on May 21, 2007, now Pat. No. 8,289,371.

(60) Provisional application No. 61/264,310, filed on Nov. 25, 2009.

(51) Int. Cl.
*H04N 7/14* (2006.01)
*H04N 7/15* (2006.01)
*H04N 5/262* (2006.01)

(52) U.S. Cl.
CPC ............ *H04N 7/152* (2013.01); *H04N 5/2628* (2013.01); *H04N 7/142* (2013.01)

(58) Field of Classification Search
CPC ...................................................... H04N 7/14
USPC ..................... 348/14.01, 14.07, 14.12, 14.16
See application file for complete search history.

(56) References Cited

U.S. PATENT DOCUMENTS

| | | |
|---|---|---|
| 4,823,108 A | 4/1989 | Pope |
| 6,340,992 B1 | 1/2002 | Markandey |
| 6,496,216 B2 | 12/2002 | Feder et al. |
| 6,584,077 B1 | 6/2003 | Polomski |
| 6,757,005 B1 | 6/2004 | Elbaz et al. |
| 6,959,045 B2 | 10/2005 | Hurst, Jr. |
| 7,477,281 B2 | 1/2009 | Chandra et al. |
| 7,499,075 B2 | 3/2009 | Miceli |

(Continued)

*Primary Examiner* — Olisa Anwah
(74) *Attorney, Agent, or Firm* — Blank Rome, LLP (57) ABSTRACT

Dynamically adapting a continuous presence (CP) layout in a videoconference enhances a videoconferencing experience by providing optimum visibility to regions of interest within the CP layout and ignoring regions of no interest. Based on the CP layout, a CP video image can be built, in which a conferee at a receiving endpoint can observe, simultaneously, several other participants' sites in the conference. For example, more screen space within the CP layout is devoted to presenting the participants in the conference and little or no screen space is used to present an empty seat, an empty room, or an unused portion of a room. Aspect ratios of segments of the CP layout (e.g., landscape vs. portrait) can be adjusted to optimally present the regions of interest. The CP layout can be adjusted as regions of interest change depending on the dynamics of the video conference.

20 Claims, 8 Drawing Sheets

(56) References Cited

U.S. PATENT DOCUMENTS

| | | |
|---|---|---|
| 7,542,068 B2 | 6/2009 | Eshkoli et al. |
| 7,623,719 B2 | 11/2009 | Molino et al. |
| 7,768,543 B2 | 8/2010 | Christiansen |
| 8,019,170 B2 | 9/2011 | Wang et al. |
| 8,035,679 B2 | 10/2011 | Eisenberg et al. |
| 8,179,961 B2 | 5/2012 | Chen et al. |
| 8,208,758 B2 | 6/2012 | Wang et al. |
| 8,289,371 B2 | 10/2012 | Wagner et al. |
| 8,675,067 B2 | 3/2014 | Chou et al. |
| 2002/0191861 A1 | 12/2002 | Cheatle |
| 2005/0008240 A1 | 1/2005 | Banerji et al. |
| 2005/0195275 A1 | 9/2005 | Lia et al. |
| 2006/0204113 A1 | 9/2006 | Wang et al. |
| 2006/0215752 A1 | 9/2006 | Lee et al. |
| 2006/0215753 A1 | 9/2006 | Lee et al. |
| 2006/0215766 A1 | 9/2006 | Wang et al. |
| 2006/0238444 A1 | 10/2006 | Wang et al. |
| 2006/0238445 A1 | 10/2006 | Wang et al. |
| 2007/0043527 A1 | 2/2007 | Quan et al. |
| 2007/0046525 A1 | 3/2007 | Holbrook et al. |
| 2007/0183661 A1 | 8/2007 | El-Maleh et al. |
| 2007/0183663 A1 | 8/2007 | Wang et al. |
| 2008/0048975 A1 | 2/2008 | Leibow |
| 2008/0068443 A1 | 3/2008 | Thielman et al. |
| 2008/0068449 A1 | 3/2008 | Wu et al. |
| 2008/0152245 A1 | 6/2008 | El-Maleh et al. |
| 2008/0208059 A1 | 8/2008 | Hall et al. |
| 2008/0291265 A1 | 11/2008 | Wagner et al. |
| 2008/0304808 A1 | 12/2008 | Newell et al. |
| 2008/0316298 A1 | 12/2008 | King et al. |
| 2009/0086013 A1 | 4/2009 | Thapa |
| 2009/0147991 A1 | 6/2009 | Chau |
| 2010/0002069 A1* | 1/2010 | Eleftheriadis .......... H04N 7/152 348/14.08 |
| 2010/0060727 A1 | 3/2010 | Steinberg et al. |
| 2010/0091330 A1 | 4/2010 | Marchesotti et al. |
| 2010/0103245 A1 | 4/2010 | Decker et al. |
| 2010/0109680 A1 | 5/2010 | Adams et al. |
| 2010/0302446 A1 | 12/2010 | Mauchly et al. |
| 2011/0085017 A1 | 4/2011 | Robinson et al. |
| 2011/0090302 A1 | 4/2011 | Leviav et al. |
| 2011/0251267 A1 | 10/2011 | Hu |

\* cited by examiner

FIG. 7B

DYNAMIC ADAPTION OF A CONTINUOUS PRESENCE VIDEOCONFERENCING LAYOUT BASED ON VIDEO CONTENT

CROSS REFERENCE TO RELATED APPLICATION

This application this application is a continuation of U.S. patent application Ser. No. 13/857,746, filed Apr. 5, 2013, which is a continuation of U.S. patent application Ser. No. 12/683,806, filed Jan. 7, 2010, now U.S. Pat. No. 8,446,454, which is a continuation-in-part of U.S. patent application Ser. No. 11/751,558, filed May 21, 2007, now U.S. Pat. No. 8,289,371. U.S. patent application Ser. No. 12/683,806 also claims priority to U.S. Provisional Patent Application Ser. No. 61/264,310, filed Nov. 25, 2009. The entire contents of all of the above are incorporated herein by reference for all purposes.

TECHNICAL FIELD

The present disclosure generally relates to the field of communication and more specifically to methods and systems for video conferencing.

BACKGROUND ART

Videoconferencing enables individuals located remote from each other to have face-to-face meetings on short notice using audio and video telecommunications. A videoconference can involve as few as two sites (point-to-point) or several sites (multi-point). A single participant may be located at a conferencing site or there may be several participants at a site, such as at a conference room. Videoconferencing can also be used to share documents, information, and the like.

Participants in a videoconference interact with participants at other sites via a videoconferencing endpoint. An endpoint is a terminal on a network, capable of providing real-time, two-way audio/visual/data communication with other terminals or with a multipoint control unit (MCU, discussed in more detail below). An endpoint may provide speech only; speech and video; or speech, data and video communications, etc. A common videoconferencing endpoint comprises a display unit on which video images from one or more remote sites can be displayed. Exemplary endpoints can include Polycom VSX series, HDX series, etc. (each available from Polycom, Inc.). The videoconferencing endpoint sends video and/or data from a local site to the remote site(s) and displays video and/or data received from the remote site(s) on a screen.

Video images displayed on a screen at a videoconferencing endpoint can be arranged in a layout. The layout may include one or more allocated areas (segments) for displaying video images. A segment can be a portion of the screen of a receiving endpoint that is allocated to a video image received from one of the sites participating in the session. For example, in a videoconference between two participants, a segment can cover the entire display area of the screen of the local endpoint. Another example can be in a video conference between a local site and multiple other remote sites if the videoconference is conducted in switching mode, i.e., such that video from only one other remote site is displayed at the local site at a single time and the displayed remote site can be switched, depending on the dynamics of the conference. In contrast, in a continuous presence (CP) conference, a conferee at a terminal can observe, simultaneously, several other participants' sites in the conference. Each site may be displayed in a different segment of the layout, wherein each segment may be the same size or a different size. The choice of the sites displayed and associated with the segments of the layout may vary among different conferees that participate in the same session. In a continuous presence (CP) layout, a received video image from a site can be scaled down in order to fit a segment size.

A multipoint control unit (MCU) can be used to manage a video communication session (i.e., a videoconference). An MCU is a conference controlling entity that can be located in a node of a network or in a terminal, which can receive and process several media channels, from access ports, according to certain criteria and distributes them to the connected channels via other ports. Examples of MCUs include the MGC-100 and RMX 2000 (available from Polycom Inc.). Some MCUs are composed of two logical units: a media controller (MC) and a media processor (MP). A more thorough definition of an endpoint and an MCU can be found in the International Telecommunication Union ("ITU") standards, such as but not limited to the H.320, H.324, and H.323 standards. Additional information regarding the ITU standards can be found at the ITU website www.itu.int.

To present a video image within an allocated area (a segment) over a screen (a layout) of a receiving endpoint (site), the entire received video image can be manipulated, scaled down and displayed or a portion of the video image can be cropped by the MCU and be displayed, for example. An MCU can crop lines or columns from one or more edges of a received conferee video image in order to fit it to the area of a segment in the layout of the videoconferencing image. Another cropping method may crop the edges of the received image according to a region of interest in the image, as disclosed in U.S. patent application Ser. No. 11/751,558, the entire contents of which are incorporate herein by reference.

Figure 1:
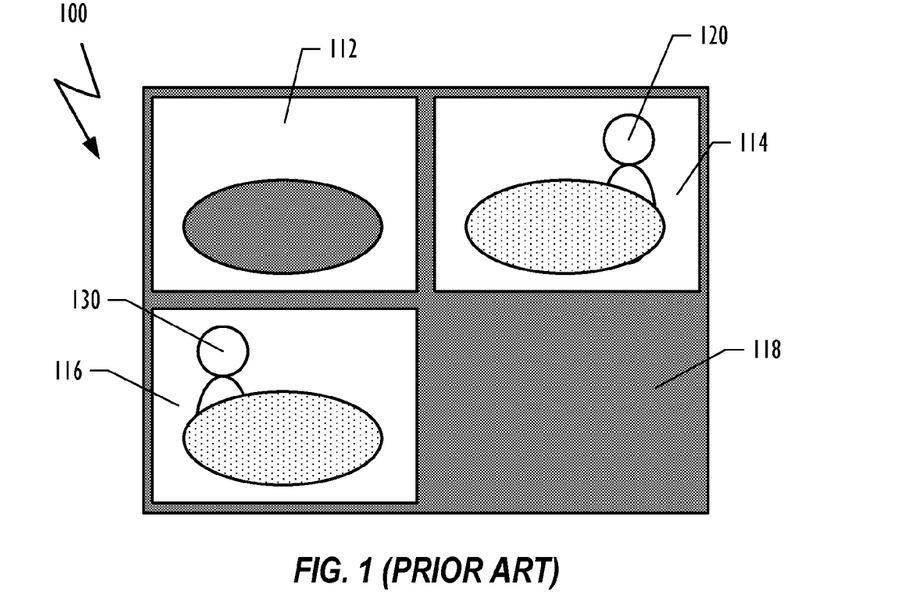
FIG. 1 illustrates an exemplary prior art 2×2 layout displayed.

In a videoconferencing session the size of a segment in a layout may be defined according to a layout selected, by a conferee for example, to be used in the session. For example in a 2×2 layout, each segment is in the size of substantially a quarter of the display as illustrated in FIG. 1. Layout 100 includes segments 112, 114, 116 and 118. In a 2×2 layout if five sites are taking part in a session, conferees at each site can see the other four sites.

In the example illustrated in FIG. 1, at a certain period of time only three quarters of the area of the display is used—segments 112, 114, and 116—while the fourth quarter 118 is occupied by a background color, for example. Such a situation may occur when only four sites are active and each site sees the other three. Furthermore, segment 112 displays an empty room, while the sites presented in segment 114 and 116 each include a single conferee 130. Consequently during this period of the session only half of the screen area is effectively used and the other half is ineffectively used. The area of segment 118 and segment 112 do not contribute to the conferees' experience and therefore are not exploited in a smart and effective manner.

Furthermore as can be seen in both segment 114 and 116, a major area of the image is redundant. In other words, the video images capture a large portion of the room while the conferees' images 120 and 130 are small and located in a small area. In those cases as in many other examples a significant portion of the display area is wasted on uninteresting areas. Consequently, the area that is captured by the conferees' images is affected and the experience of the conferees viewing the layout of the video conference is poor.

Moreover, there are conference sessions in which one or more sites have a single participant, while in other sites there are two or more participants. In currently available layouts, each site receives similar segment sizes and as a result, each participant at a site with a plurality of conferees is displayed over a smaller area than a conferee in a site with less participants, degrading the experience of the viewer.

If during a conference call one of the conferees steps far from the camera, that conferee's image will seem smaller and again the experience of the conferees viewing the layout of the video conference is degraded. Likewise, if the conferees at a displayed site leave the room for a certain time and return afterward, the empty room is displayed on the layout during the conferees' absence.

In some known techniques the viewing conferees at the other sites can manually change the layout viewed at their endpoints to adjust to the dynamics of the conference. Changing the layout can be done manually by the conferees, but this requires the conferees to stop what they are doing and deal with a layout menu to make such an adjustment, for example.

SUMMARY OF INVENTION

We found that there is a need for a method and system that can offer a wide variety of layouts in which the area of the screen can be divided among the different conferees in a flexible way. Furthermore, there is a need for a dynamic adaptation of the layout to the content of the video images that are currently received from the endpoints that participate in the session.

Exemplary embodiments of the present disclosure provide a more natural, studio like, videoconferencing user experience. Exemplary embodiments of a system and method are disclosed for presenting an automatic and dynamic layout adaptation of a CP video conferencing layout that solves the needs in the art discussed above. The systems and methods automatically divide the area of a CP layout among a plurality of sites, wherein the segment location and size allocated to each site depends on the video content, and more specifically on a current region of interest (ROI) in the video images of the sites.

According to the present disclosure video images from different sites participating in the conferencing session are decoded and processed. Periodically (each decision period) a decision can be made regarding a region of interest (ROI) in each video image. The size and the location of each ROI can be calculated. The size can be calculated in pixels according to width and height (W; H), for example. Additional criteria can be used for selecting the sites to be displayed in an adaptive layout. An exemplary embodiment may consider an audio energy indication received from each site. Other embodiments may use management decisions such as the title/rank of the conferee in each site, etc.

Different algorithms can be used for determining the ROI in each site's image. From time to time, an exemplary embodiment can capture a single frame from each of the received video images and analyze the captured frame to define an ROI. An exemplary algorithm may analyze the hue of areas of the video image, to identify flesh tone colors to define regions in which a conferee is displayed. Such an embodiment may include a bank of flesh tones colors according to different races, for example.

Other embodiments may use a face detector algorithm for determining the location of a face of a conferee. Exemplary face detector algorithms include SHORE™, available from Fraunhofer IIS, Erlangen, Germany. SHORE is a highly optimized software library for face and object detection and fine analysis. Another exemplary algorithm can be VeriLook SDK, available from Neurotechnology, Vilnius, Lithuania. Yet another exemplary face detector algorithm includes OpenCV, available from INTEL Corporation. A reader who wishes to learn more on face detectors is invited to visit http://www.consortium.ri.cmu.edu/projOmega.php or http://www.consortium.ri.cmu.edu/projFace.php.

An exemplary automatic dynamic decision algorithm can use motion vector criteria to define a region of interest of a video image. Such an embodiment may utilize a motion detector for defining a region of interest. The motion detector algorithm may also implement filters for reducing effects of uninteresting (interference) types of movements such as movements of fans, clocks, etc. Some of the filters may use low pass filters for removing fans, for example. Other filters can be notch filters to remove the movement of clock pointers, digit of a clock display, etc. Other embodiments may use band-pass filter. The band-pass filter can match the frequency range of common movements of a conferee, for example.

Alternative embodiments may use methods other than video processing for determining the presence and/or location of a conferee in the room. For example, an RFID (radio frequency identification) can be used for determining the presence of a conferee in a room. Each participant can hold an RFID card and the system can include an RFID detector in the videoconferencing rooms, for example. Yet in an alternative embodiment audio received from two or more microphones located in the room can be used for determining the location of a speaker.

Based on the size and location of a detected face an exemplary embodiment may estimate the size of a region of interest around the detected face. For example after defining the size and the location of the face the size of the ROI can be defined as a multiple of the detected face size, for example. For example, if the size of a face in numbers of pixels width×height (W×H), the ROI might be defined as 3-6 times W×H. The ROI can surround the face from a little above the face and so on. In other embodiments the size of the segment is defined first and then the image is cropped around the ROI to fit the required segment size.

The area of a next CP layout that will be presented until the next image capture can be divided among the video images received from the sites, which include detected region of interest, conferees 120 and 130 for example. The size of a segment that is associated to each site in the CP layout can be substantially proportional to the size of the region of interest in the image received from that associated site. The rest of the received images from the sites that do not have a detected ROI can be removed from the adapted layout and not be displayed. Thus, images of an empty room at a conferencing site can be removed from the layout, for example.

Figure 2A:
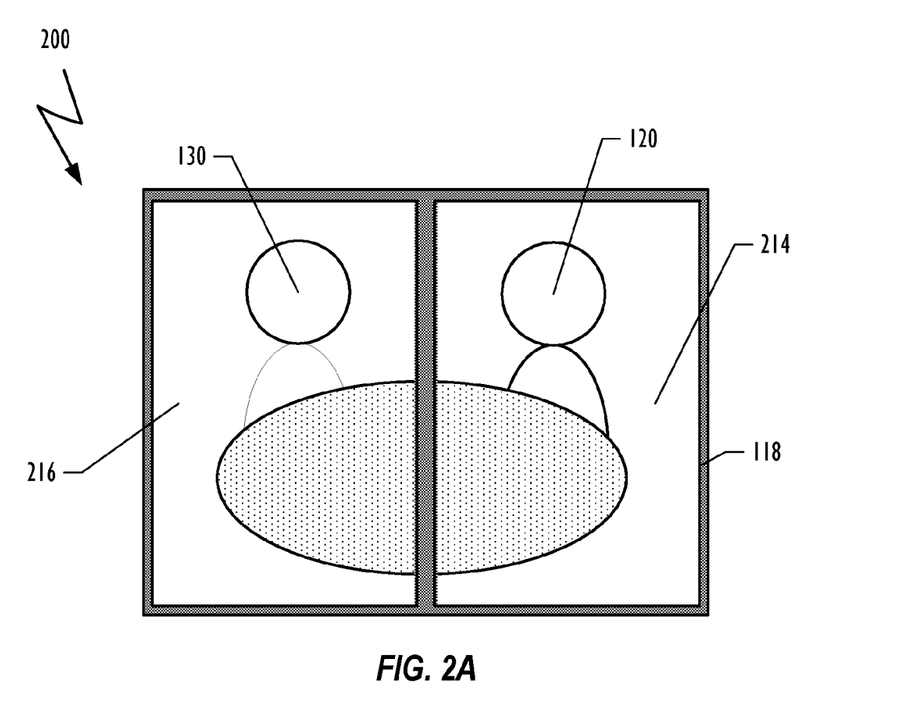
FIGS. 2a and 2b illustrates an exemplary layout adapted according to video content (ROI) according to the present disclosure teaching.

FIG. 2a illustrates an exemplary layout 200 of a period in time of the conference session presented in the prior art layout 100 (FIG. 1) after implementing an exemplary technique of the present disclosure. The captured images received from the four sites are analyzed. Only two images were found that include an ROI—around conferees 120 and 130. Therefore, the area of the adapted layout can be divided into two segments 214 and 216 instead of four. Segments 112 and 118 of FIG. 1 are thus removed from the layout and remaining segments 214 and 216 (corresponding to 114 and 116 of FIG. 1, respectively) are displayed in an orientation (portrait or landscape) most appropriate for the ROI as illustrated in FIG. 2a. The height (number of pixels) of each segment can be substantially similar to the height of its associated received video image, while the width of each segment can be cropped to include about half of the received image. Thus only the conferee in the image and his close surroundings are displayed instead of displaying the entire room, most of which is empty and therefore uninteresting.

Consequently the experience of the conferees receiving the adapted layout 200 is improved because the received images of the conferees presented in the layout 200 are bigger and no redundant areas are displayed. This can produce a similar effect as a zoom effect.

If the sum of the sizes, in pixels, of the ROIs of each received image is bigger than the size of the layout of the CP image, then the ROIs can keep their proportion and be scaled down, for example. Alternatively, the segment can be cropped to a smaller area around each ROI, or any combination of these two methods can be used.

An exemplary embodiment of the present disclosure can detect that a person has entered the site of an empty segment, such as segment 112 FIG. 1. In case a conferee enters the room then an exemplary embodiment of the present invention can automatically change the adapted layout displayed. The bottom half of segments 214 and 216 can be cropped and instead a 3rd segment for presenting the new site region of interest can be added, for example (not shown in the drawings).

Figure 2B:
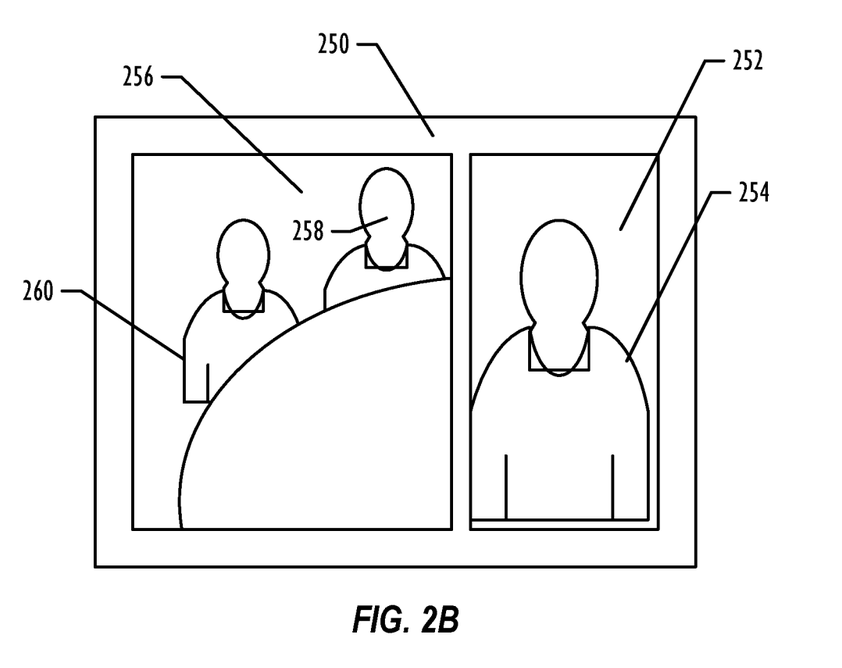

FIG. 2b illustrates yet another automatic adaptive layout 250 that can be created by an embodiment of the present disclosure. During a certain decision point two sites were found with ROIs. However, one site features two conferees 258 and 260 while in the other site features only one conferee 254. As a result of analyzing the captured images an asymmetric adaptive layout 250 can be created. In layout 250 a wide segment 256 can be allocated to the site with two conferees 258 and 260 while a narrower segment 252 can be allocated to the site with one conferee 254. In both segments the video images have been automatically manipulated to display only the region of interest in methods as described above.

Another embodiment may use a face tracking mechanism. In such an embodiment an area which was defined as an ROI can be kept in the middle of a segment regardless even if the ROI moves, creating an effect that is similar to the effect of tracking a face with a video camera. In such an embodiment the displayed area can be dynamically and automatically updated according to the movement of the conferee, keeping the face in the center of the segment.

These and other aspects of the disclosure will be apparent in view of the attached figures and detailed description. The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF DRAWINGS

Exemplary embodiments of the present disclosure will be more readily understood from reading the following description and by reference to the accompanying drawings, in which.

DESCRIPTION OF EMBODIMENTS

Turning now to the figures in which like numerals represent like elements throughout the several views, exemplary embodiments, aspects and features of the disclosed systems and methods are described. For convenience, only some elements of the same group may be labeled with numerals. The purpose of the drawings is to describe exemplary embodiments and not for production or limitation.

Figure 3:
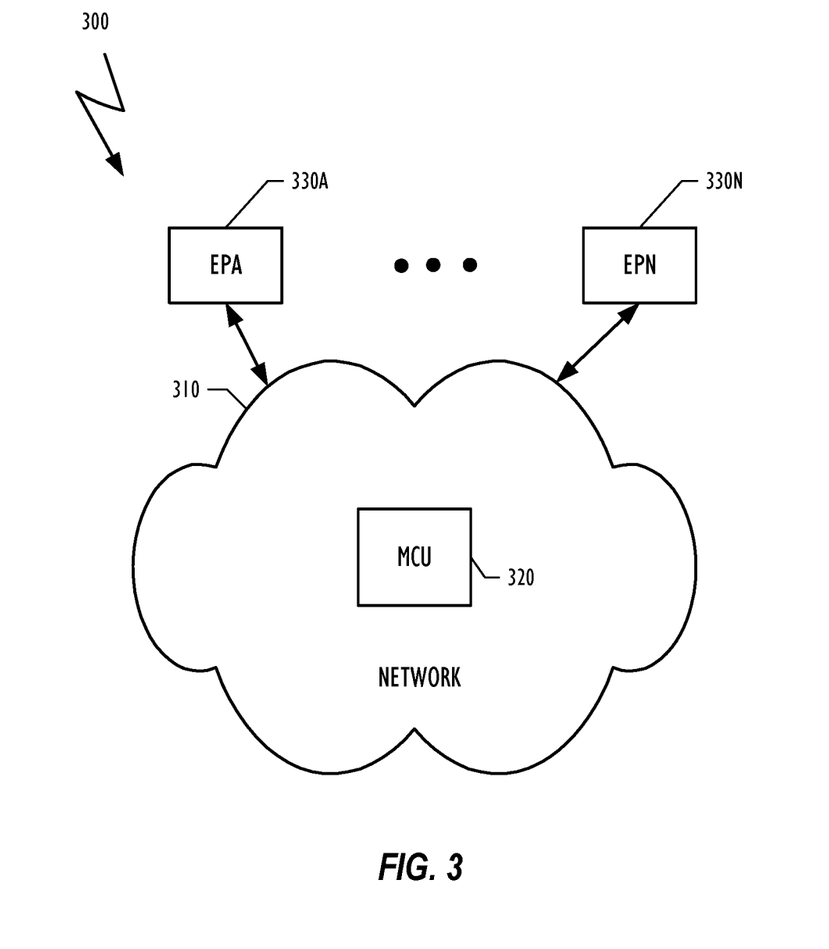
FIG. 3 is a block diagram illustrating elements of an exemplary multimedia multipoint conferencing system in which an exemplary embodiment of the present disclosure can be implemented.

FIGS. 1, 2a and 2b were described above and will not be further described. FIG. 3 illustrates elements of an exemplary multimedia multipoint conferencing system 300. System 300 can include a network 310, one or more multipoint control unit (MCU) 320 and a plurality of endpoints in different sites 330a-n. Network 310 can be a packet switched network, a circuit switched network or any combination of the two, for example. The multimedia communication over the network can be based on communication protocol such as, but not limited to: H.320, H.323, SIP, etc.

Figure 4:
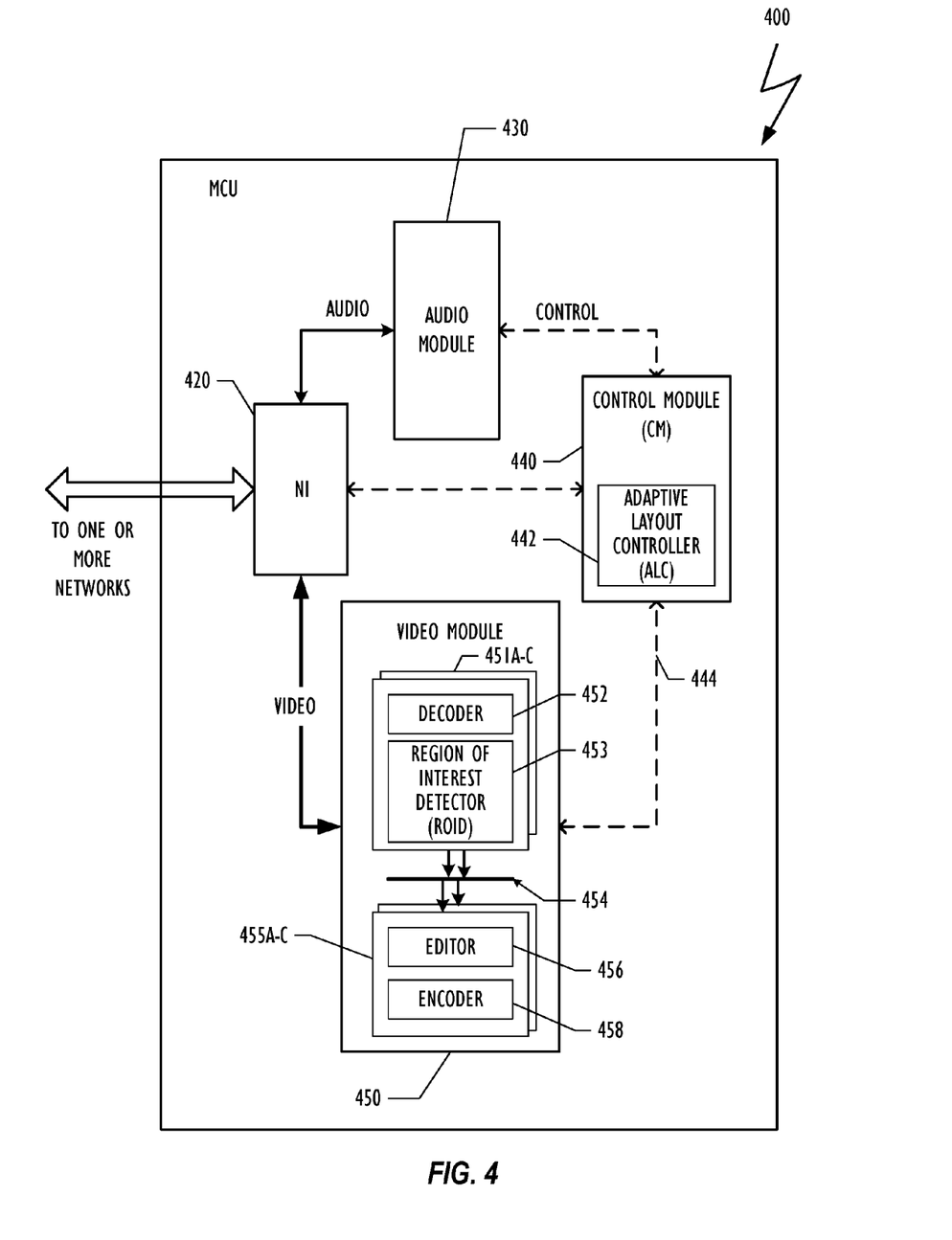
FIG. 4 illustrates elements of an exemplary MCU 400 capable of implementing the system and method of dynamically and automatically adapting a CP layout, according to the present disclosure.

MCU 320 and endpoints 330a-n can be adapted to operate according to embodiments of the present disclosure to improve the experience of a conferee looking at a CP video image of a multipoint video conferencing. In embodiments implementing a centralized architecture, MCU 320 can be adapted to perform the automatic display adaptation methods described herein. Alternatively, endpoint 330a-n with or without MCU 320 can be adapted to perform the automatic display adaptation methods. More information about the operation of MCU 320 and endpoints 330a-n according to different embodiments is disclosed below. FIG. 4 illustrates an exemplary MCU 400, which is capable of dynamically and automatically adapting a CP layout. MCU 400 may include a network interface module (NI) 420, an audio module 430, a control module 440 and a video module 450. The network interface module 420 can receive communication from a plurality of endpoints 330a-n (FIG. 3) via networks 310 (FIG. 3). Network interface 420 can process the communication according to one or more communication standards such as, but not limited to: H.320, H.323, SIP, etc. Network interface 420 can also process the communication according to one or more compression standards such as, but not limited to: H.261, H.263, H.264, G711, G722; MPEG etc. Network interface 420 can receive and transmit control and data information to/from other MCUs and endpoints. More information concerning the communication between endpoint and the MCU over network 310 and information describing signaling, control, compression, and setting a video call can be found in the international telecommunication union (ITU) standards H.320, H.321, H.323, H.261, H.263, H.264 G711, G722, and MPEG etc.

Network interface module 420 can multiplex/de-multiplex the different signals, media and/or "signaling and control" that are communicated between the endpoints and the MCU. The compressed audio signal can be transferred to and from the audio module 430. The compressed video signal can be transferred to and from the video module 450. The "control and signaling" signals can be transferred to and from control module 440. Furthermore, if a distributed architecture is used, network interface module 420 can be capable of handling automatic and dynamic CP layout adaptation related information that is transferred between the control module 440 and the endpoints 330a-n (FIG. 3).

In an exemplary embodiment in which the automatic and dynamic CP layout adaptation information is sent as a part of a predefined header of a payload of an RTP (Real-time Transport Protocol) packet, NI 420 can be adapted to process the predefine header to add automatic and dynamic CP layout adaptation information to the RTP packet. The automatic and dynamic CP layout adaptation information can include the size and location of a region of interest (ROI) in pixels, for example. In an alternate embodiment, ROI communication can be executed via the Far End Camera Control (FECC, not shown in FIG. 4) channel, for example.

Audio module 430 may receive, via network interface 420 compressed audio streams from the plurality of endpoint 330a-n (FIG. 3). The audio module 430 can decode the compressed audio streams, analyze the decoded streams, select certain streams and mix the selected streams. The mixed stream can be compressed and the compressed audio stream can be sent to the network interface 420, which sends the compressed audio streams to the different endpoints 330a-n (FIG. 3). Audio streams that are sent to different endpoints can be different. For example the audio stream can be formatted according to a different communication standard and according to the needs of the individual endpoint. The Audio stream may not include the voice of the user associated with the endpoint to which the audio stream is sent. However, the voice of this user may be included in all other audio streams.

In some exemplary embodiments of the disclosure, an endpoint can be configured to define its audio energy and send the information on the audio energy in association to its compressed audio signal.

Audio module 430 can be adapted to analyze the received audio signals from the endpoints and determine the energy of each audio signal. Information on the signal energy can be transferred to the control module 440. In some embodiments two or more microphones can be used in a certain site. The energy from each microphone can be used for determining the ROI of certain sites, for example. In some embodiments the energy level can be used as a selection parameter for selecting appropriate one or more endpoints as the source of the mixing of the audio and/or the video of the conference. The endpoints can be referred as selected endpoints or presented endpoints. Yet, in some other exemplary embodiments of distributed architecture an endpoint may have some of the functionality of the audio module 430.

Video module 450 can receive compressed video streams from the plurality of endpoints 330a-n (FIG. 3), which are sent toward the MCU 400 via network 310 (FIG. 3) and processed by network interface (NI) 420. Video module 450 can create one or more compressed CP video images according to one or more layouts that are associated with one or more conferences currently being conducted by the MCU 400. An exemplary video module 450 can have a plurality of input modules 451a-c, a plurality of output modules 455a-c and a video common interface 454. Each input module 451a-c can be associated with an endpoint. Each output module 455a-c can be associated with one or more endpoints.

Control module 440 can be a logical unit that controls the operation of the MCU 400. In addition to common operation of a typical MCU, MCU 400 is capable of additional functionality as result of having the control module 440. Control module 440 can include an adaptive layout controller (ALC) 442. An exemplary ALC 442 can be responsible to adapt the layout that will be displayed in each site. The ALC 442 can receive information and updates from the NI 420. Such information can include, but is not limited to: the number of sites that will participate in the conference call, which site has departed, which sites have been added, and so on. Other information can be commands regarding the layout that one or more participants request, for example.

The ALC 442 can receive information and updates from the audio module 430, such as audio signal strength measured from each site, for example. According to information received from the NI 420 and the audio module 430, the ALC 442 can send command controls to the video module 450. Exemplary commands can: identify an ROI in certain sites, scale down or scale up images from certain sites, crop certain images, build an updated layout with certain number of segments having certain sizes and format/proportion (landscape or portrait), and so on.

In an alternate exemplary embodiment in which decentralized (distributed) architecture is implemented, an exemplary ALC 442 can be capable of providing commands to the endpoints (330a-n FIG. 3) themselves. In an exemplary embodiment the size, in pixels for example, of the ROI over each image in the layout is sent to the endpoint with a request to the endpoint to present a layout such that: certain number of segments with certain segments size will be displayed, the ROI size and place of each segment is optimized, and so on. Such communication with the endpoint can be out of band, over an Internet Protocol (IP) connection for example. In other embodiments the communication can be in band, for example as part of the predefined header of the payload of an RTP packet, or FECC, for example.

In an exemplary embodiment, an output module 455a-c associated with an endpoint can be instructed to crop certain images around the ROI and place them in certain segments in the adaptive CP image. More information on the operation of ALC 442 is discussed below in conjunction with FIG. 7. In some embodiments ALC 442 can be embedded within the video module 450. Yet in another embodiment the ALC 442 can be a part of each one of the output module 455a-c. In another exemplary embodiment of a distributed architecture ALC 442 can be located in an endpoint.

Exemplary video module 450 can comprise a plurality of input modules 451a-c; a plurality of output modules 455a-c; and a common interface 454. Exemplary input module 451a-c can include among other elements a decoder 452 and a region of interest detector (ROID) 453. Exemplary ROID 453 may be a sub-module of input modules 451a-c, or in an alternate embodiment ROD 453 can be a sub-module of video module 450. An exemplary input module 451a-c can be associated with an endpoint and may process compressed video images received from its associated endpoint. The decoder 452 can receive compressed video from an associated endpoint and can decode the compressed video into decoded video data. Usually the decoded video data is constructed from three components, YUV. The Y component reflects the brightness and the U and V components reflect the chrominance of the pixel, for example. The decoded information is stored in a decoder frame memory from which it is transferred toward one or more output modules 455a-c via common interface 454.

In an exemplary embodiment, the data of the decoder frame memory can be sampled by the ROID 453. ROID 453 can be adapted to analyze the video image received from the associated endpoint and to define the coordinates of one or more ROIs. From time to time, periodically and/or upon receiving a command from the ALC 442, the ROID 453 can sample, a captured frame of the decoded video. The ROID can then analyze the sampled image and identify the ROIs. The analysis can be done according to one or more different detection methods. Methods such as, but not limited to: motion detection, flesh tone detectors, audio energy indication of audio signal received from a plurality of microphones located in the same room, face detectors, or different combination of different detectors. The ROID 453 can output detected information on the ROI size and location to the ALC 442 via control line 444, for example.

In some embodiments the ROID 453 may deliver parameters according to the size of the ROI as well as the number of participants in the video image. In distributed architecture, an exemplary ROID 453 can be located in an endpoint and may process the video data generated by its video camera. More information about the operation of ROID 453 is discussed below in conjunction with FIGS. 5 and 6.

Among other elements an exemplary output module 455a-c may include an editor 456 and an encoder 458. Editor 456 can get decoded data of selected video images from the common interface 454 to be composed into a CP image created by the output module 455. The editor 456 may scale, crop, and place the video data of each conferee into an editor frame memory according to the location and the size of the image in the layout associated with the composed video of the CP image. Cropping can be done according to the instructions received from ALC 442. The cropping instruction takes into account the defined ROI. Editor 456 and encoder 458 may each be considered as modules, or as sub-modules of output modules 455a-c.

When the editor frame memory is ready with all the selected conferee's images with or without an adapted cropped image, the data in the frame memory is ready to be encoded by encoder 458 and sent toward its associated endpoint. In a distributed architecture an exemplary endpoint can include an editor 456. In such embodiment, the editor can be located after a decoder of the endpoint. The editor can be configured to collect the decoded video images received from a plurality of endpoints, to build the frames of the CP video images based on received ROI information regarding each video image, and send the composed CP video image toward a display unit of the endpoint. Additional functions of a video module such as 450 are described in U.S. patent application Ser. No. 10/144,561; U.S. Pat. No. 6,300,973; and International Application Serial No. PCT/IL01/00757, the contents of which are incorporate herein by reference.

Figure 5:
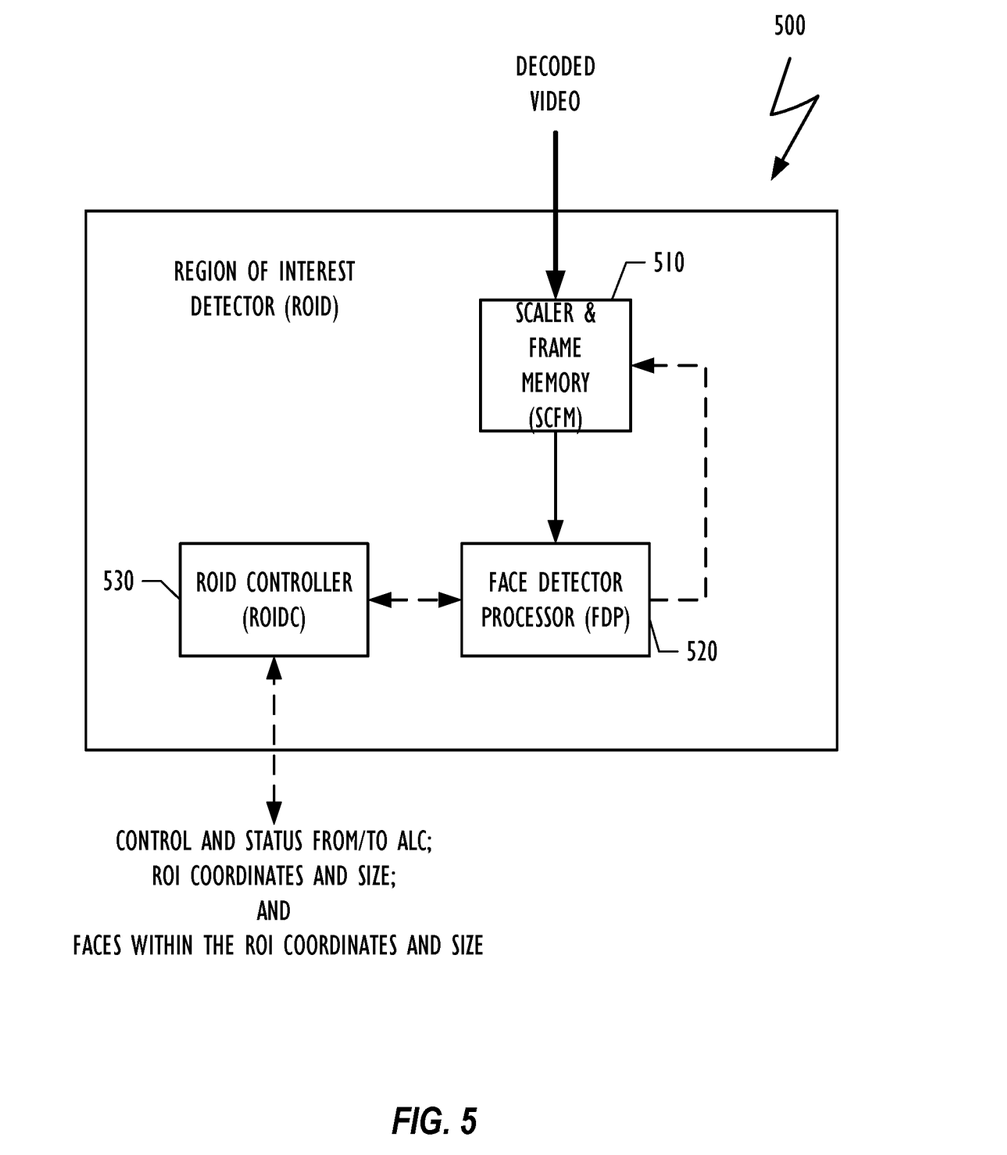
FIG. 5 is a block diagram illustrating elements of an exemplary region of interest detector (ROID) 500, according to the present disclosure.

FIG. 5 illustrates elements of an exemplary region of interest detector (ROID) 500. An exemplary ROID 500 can include a scaler and frame memory (SCFM) 510, a face detector processor (FDP) 520, and an ROID controller (ROIDC) 530. The face detector processor (FDP) 520 can be implemented on a DSP that is adapted to execute a known face detector method such as VeriLook SDK, available from Neurotechnology, or OPEN CV, available from INTEL, for example. In alternate embodiment, FDP 520 can be implemented in a built in hardware with face detection capabilities such as but not limited to Texas Instrument (TI) DM365. In an exemplary centralized architecture ROID 500 can be embedded in an MCU. In such an embodiment ROID 500 can be part of each input module 451a-c (FIG. 4). Yet in another embodiment ROID 500 can be part of the video unit 450 (FIG. 4) and can get the decoded video data from the relevant input modules 451a-c via the common interface 454 (FIG. 4). In an alternate exemplary embodiment of the present disclosure, in which TI chip DM365 is used, ROID 500 can obtain compressed video generated by the relevant endpoints and process the compressed video in order to define the ROI.

Yet in another exemplary embodiment ROID 500 can be embedded within an endpoint 330a-n (FIG. 3). In such an endpoint the ROID 500 may be used to determine the ROI in a video image that is generated by the endpoint. The ROID can be associated with the input of an encoder of the endpoint (not shown in the drawings), for example. The ROID 500 can sample a frame of a video image used at the input of the encoder of the endpoint, for example. The indication on the ROI can be transferred to the ALC 442 via NI 420 (FIG. 4). The ALC 442 may use the coordinates of the ROI to determine how to adapt the next CP layout.

In the exemplary embodiment of FIG. 5, the ROID controller (ROIDC) 530 can receive a command from the ALC 442 (FIG. 4) to detect and define an ROI of a site, for example. ALC 442 can decide in which sites to search for ROI according to different parameters such as audio signal strength, manual commands to change the layout, or a newly site has joined, and so on. ROIDC 530 can send a command to the face detector processor (FDP) 520 to find and determine an ROI in a frame of a video image received from a certain site. FDP 520 can command SCFM 510 to sample a frame of a decoded video image of the certain site. The decoded video image can be fetched by SCFM 510 from the common interface 454 (FIG. 4) or from the decoder 452 (FIG. 4) of the certain site. SCFM 510 can then scale down the video image according to the requirements of the FDP 520, and save the result in a frame memory, for example.

A loop back path between FDP 520 and SCFM 510 can be established so that FDP 520 can request SCFM 510 to: scale down the image again, scale up the image, or fetch another sample, and so on. This loop back path can be limited to a predefined number of cycles. At the end of the cycle FDP 520 can transfer information on the ROI to ROIDC 530. In case that no ROI was found, a message (such as site is vacant, for example) can be sent to the ROIDC 530. The ROID 453 can output the detected information on the ROI size and location (coordinates and/or pixel from top left, for example) to the ALC 442 via control line 444, for example.

Another exemplary embodiment of ROID 500 may comprise other units such as, but not limited to: motion detection, flesh tone detectors or different combination of different detectors. Some exemplary embodiments (not shown in the drawings) based on motion detectors may include one or more filters such as band-pass filters, low-pass filters or notch filters to remove interference motions such as clocks, fans, monitors, etc. Other embodiments may process the audio energy indication received from a plurality of microphones, etc. A person who wishes to learn more on the different ROI detectors can read U.S. patent application Ser. No. 11/751,558, filed May 21, 2007 (Publication No. 2008/0291265).

If ROID 500 is embedded within a video unit 450 (FIG. 4) of MCU 400 (FIG. 4), the communication between ROIDC 510 and control module 440 can be implemented over the control bus 444 connecting the control module 440 with a video module 450. Alternatively in an embodiment in which ROID 500 is located at an endpoint 330*a-n* (FIG. 3) while control module 440 is located at the MCU 400, the communication can be implemented out of band or in band. Out of band communication can be handled via a connection between the endpoints and the MCU over an Internet Protocol (IP) network, for example.

If multimedia communication is over a packet switched network, the communication between ROID 500 and control module 440 can be implemented using a predefined header of the payload of a Real-time Transport Protocol (RTP) video packet. In such an embodiment the coordinates of the ROI as well as the sampling command can be embedded within the predefined header of the payload of the RTP video packet. Other embodiments may use FECC channels for example.

If communication between ROID 500 and control module 440 is via one of the above methods, the network interface 420 (FIG. 3) can be adapted to parse the received information, retrieve the coordinates of the ROI received from ROID 500 and deliver the coordinates of the ROI to control module 440 over the control bus that connects the control module 440 and network interface 420. In the other direction the network interface 420 is adapted to receive sampling command and process it according to the used communication method and send it via the network 310 (FIG. 3), for example.

Figure 6:
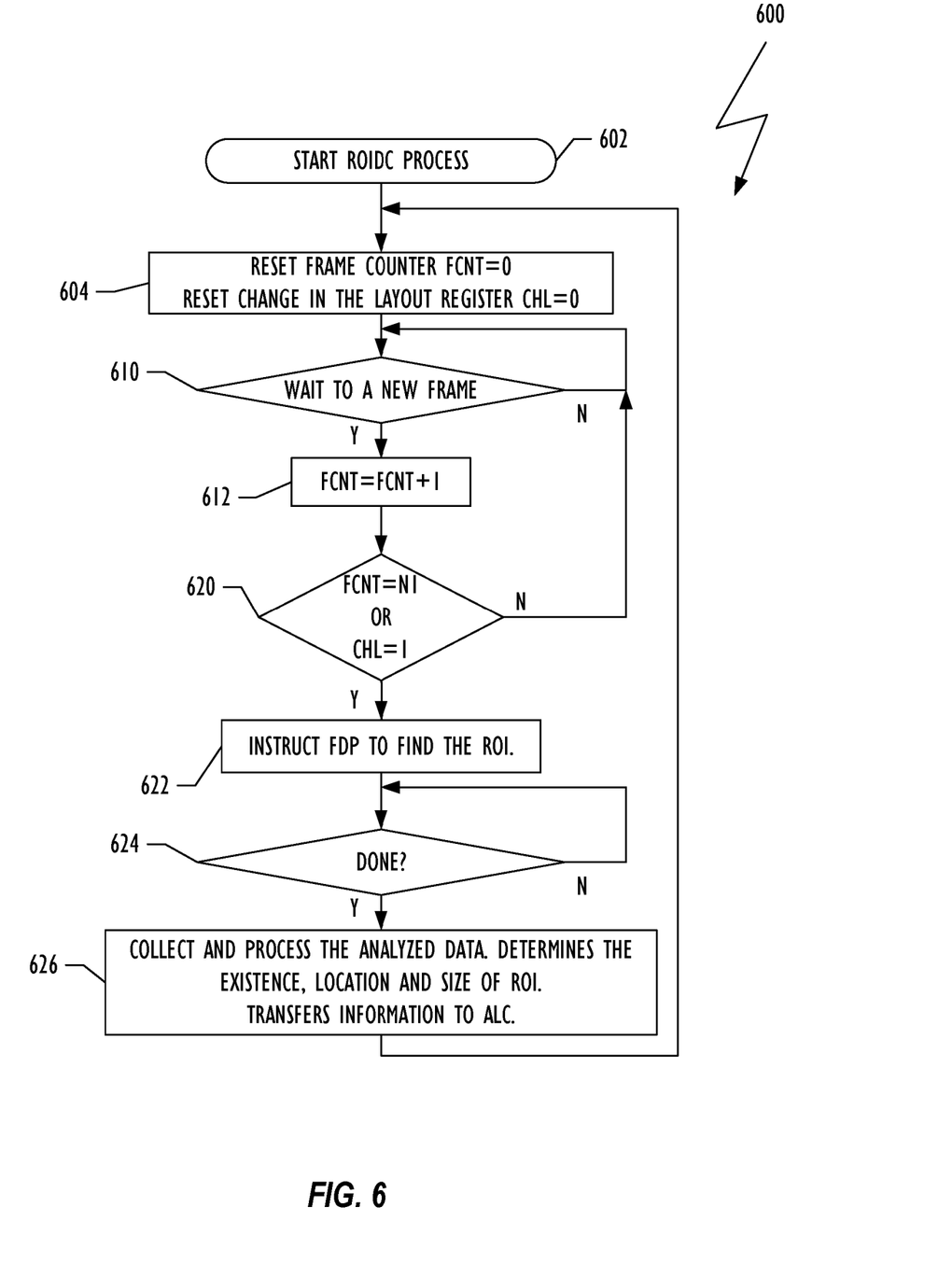
FIG. 6 is a flowchart illustrating exemplary steps of a method for defining regions of interests in a video image, according to the present disclosure.

FIG. 6 illustrates steps of method 600 that can be executed by an exemplary ROID 500 (FIG. 5). Method 600 can be used for defining regions of interest in a video image. Method 600 can be initiated 602 upon power on of ROID 500 (FIG. 5), for example. After initiation method 600 can reset 604 a frame counter (Fcnt) and a change-layout register (CHL) to zero. An exemplary frame counter (Fcnt) can count the frames at the output of an input module 451*a-c* (FIG. 4). CHL value can be 0 or 1. When CHL value equals 1 it means that a change in a layout was received from ALC 442 (FIG. 4). ALC 442 (FIG. 4) may request ROIDC 530 to search for an ROI in an image site due to change in audio signal strength, or due to management requests, a new conferee, etc. When CHL value equals 0 it means that no change in a layout has been indicated.

Next, method 600 may wait 610 to receive a new frame. If 610 a new frame is not received, then method 600 returns to step 610. If 610 a new frame is received, then method 600 proceeds to step 612 and increases the Fcnt by one. Next if 620 Fcnt value does not equal N1, and CHL value equals 0, then method 600 returns to step 610. If 620 Fcnt value equal N1, or CHL value equals 1, then method 600 proceeds to step 622. N1 can be a configured number in the range between 1 and 100, for example.

At step 622 method 600 can instruct the FDP 520 (FIG. 5) to search and define an ROI. Method 600 waits 624 till FDP 520 defines an ROI or informs that no ROI has been found. Once the FDP outputs 624 the ROI message, method 600 proceeds to step 626. At step 626 method 600 can collect and process 626 the analyzed data from FDP 520. Method 600 can determine 626 the existence of an ROI its size and location (in pixels from top left, for example). At this step Method 600 acts as an application program interface (API) between the face detector processor 520 (FIG. 5) and the ALC 442 (FIG. 4). The results are transferred 626 to ALC 442 (FIG. 4), and method 600 returns to step 604. In some exemplary embodiments, method 600 may repeat steps 622 to 626 a few times to check that the results are similar and if yes then an average ROI is transferred to the ALC 442.

Figure 7A:
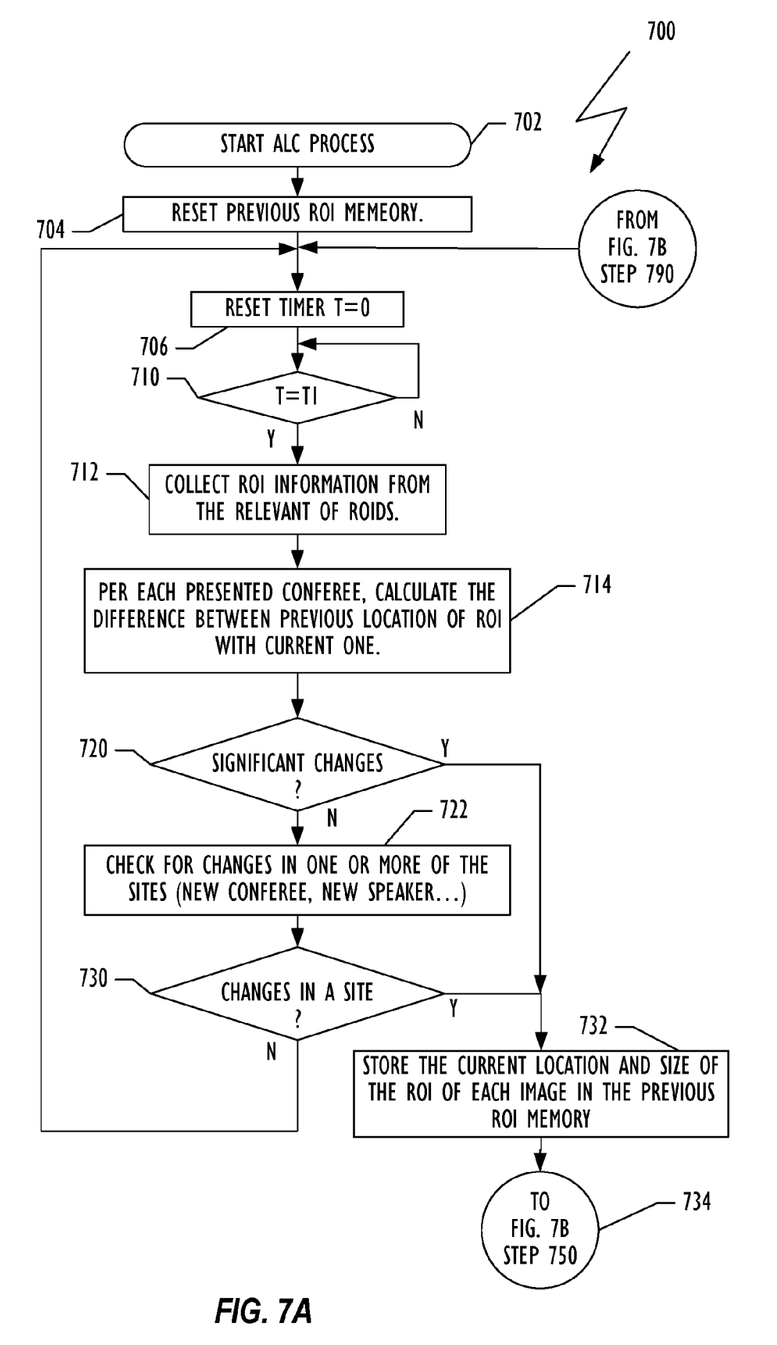
FIGS. 7a and 7b are a flowchart illustrating exemplary steps of a method for automatically and dynamically adapting one or more CP layouts, according to the teaching of the present disclosure.

FIG. 7*a* illustrates steps of method 700. Method 700 can be used for automatically and dynamically adapting one or more CP layouts. Method 700 can be executed 702 by an exemplary ALC 442 (FIG. 4). At initiation, method 700 can reset 704 Previous-ROI memory. Previous-ROI memory can be used for storing information on the previous found ROI in order to check the differences with the current ROI. Next, method 700 can reset 706 a timer (T) and wait 710 for timer T value to equal T1. T1 can be in the range of a few hundreds of msec. to few seconds, for example. Once timer T value equals T1, method 700 proceeds to step 712.

At step 712 method 700 can collect information on the ROI from relevant ROIDs 453 (FIG. 4). The relevant ROIDs are the ones that are associated to the conferees that were presented in the previous cycle looking for a change from the previous loop. For each presented conferee, method 700 can calculate 714 the difference of the current received ROI location and size compared to the previous ROI location and size (saved in Previous-ROI memory). Next a decision is made 720 whether there is a significant change in the current ROI location and size versus the previous ROI. A significant change can be a pre-defined delta in pixels or percentages, for example. An exemplary significant change can be in the range of 5 to 10%, for example. If in step 720 there is a significant change then method 700 proceeds to step 732. If in step 720 there is no significant change then method 700 proceeds to step 722.

At step 722 method 700 can check if there are management changes/requests regarding one of the sites, which has been requested by CM 440 (FIG. 4). Examples of management changes/requests include, but are not limited to: a new conferee wishes to join, a conferee requests to leave, a speaker has changed (according to measured audio signal strength), etc. If in step 730 there are no management changes/requests, then method 700 returns to step 706. If in step 730 there are one or more management changes/requests in a one or more sites then method 700 proceeds to step 732.

Returning to steps 720 and/or 730: if there was a significant change between the current received ROI and the last saved ROI or there were management changes/requests, then method 700 proceeds to step 732 stores the current received ROI location and size of each site video image in the Previous-ROI memory storage. Next, method 700 proceeds 734 to step 750 in FIG. 7*b* in which an adapted layout is calculated.

Figure 7B:
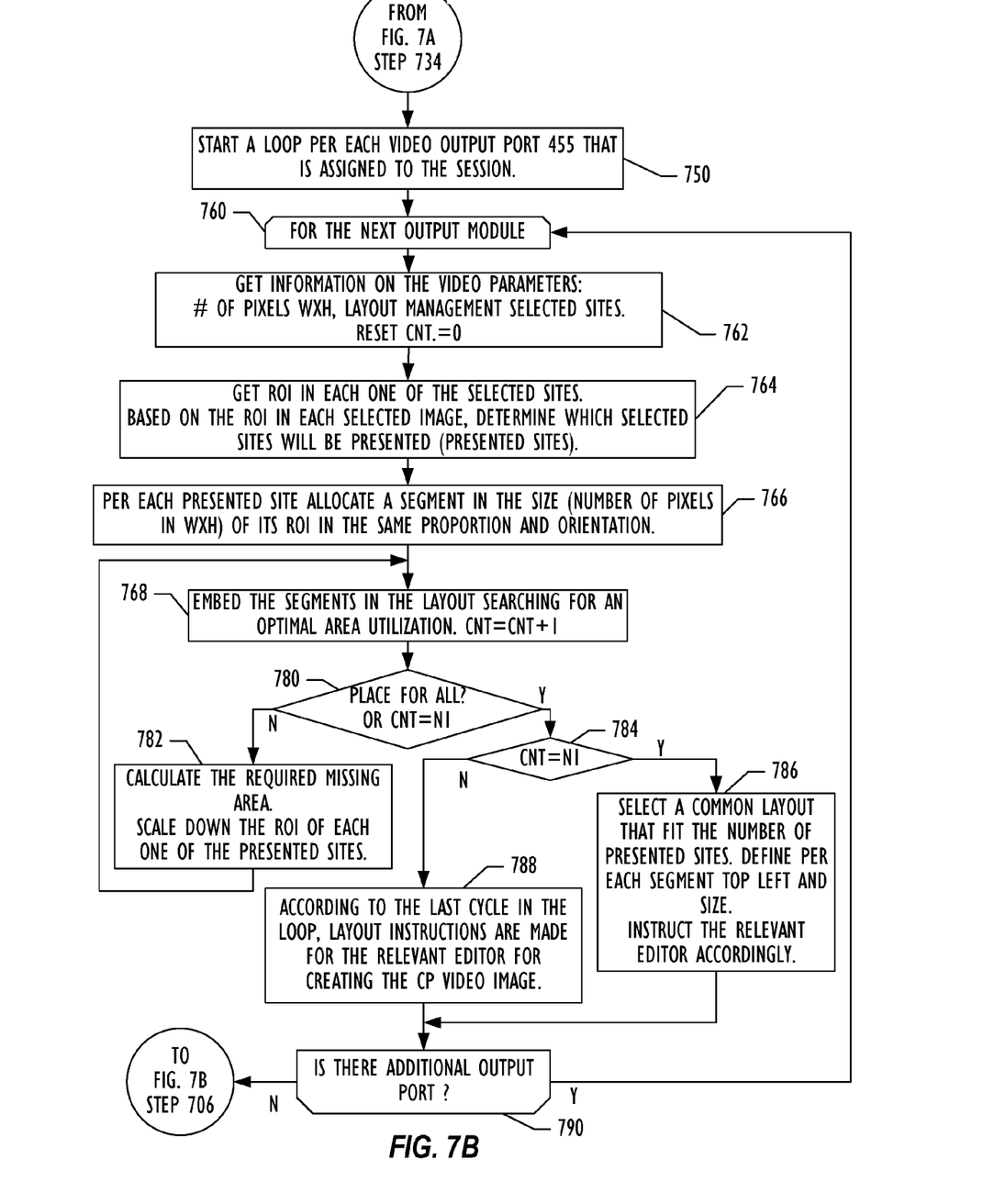

As illustrated in FIG. 7*b*, at step 750 a loop is started 760 for each output module 455*a-c* (FIG. 4). Method 700 can fetch 762 information on parameters related to the CP layout associated with the current output module. Such parameters include, but are not limited to: the layout size in number of pixels W×H, the layout format selected (2×2, 3×3, etc.), if existing, the identification of sites that have been selected to be presented based on management decision and/or audio energy, etc. Method 700 can also reset 762 a counter (CNT) that will count the number of trials.

Next method 700 can get 764 ROI information and parameters for each of the sites that were selected to be presented in the adaptive layout of the relevant output module 455*a-c* (FIG. 4). Exemplary parameters can be: the number of pixels of the ROI (height and width of the ROI), the top left location of the ROI in the received image, the number of participants in the ROI, and so on. According to the ROI and the video parameters of the current output module, method 700 can determine 764 which sites will be presented and in which layout format to present them. For example, if certain selected site does not include an ROI then method 700 can determine not to present that site.

Per each presented site method 700 can determine 766 the segment size (number of pixels) and shape that the site will be displayed in and the proportion and orientation of that segment in the layout. The proportion and orientation (landscape or portrait) can be based on the size and shape of the ROI (in pixels), for example. After allocating a segment to each one of the presented images, a trial and error loop between step 768 and 782 for embedding the segments in the layout can be initiated.

Next, method 700 can try to embed 768 the segments in the layout. An exemplary method can place the largest segment at the top left corner of the layout and then place the next largest size segment to the right of the largest segment if there is room, or below the largest segment if that is a better fit. Method 700 can proceed with the rest of the segments, until all segments are embedded or until there is no room to embed the next segment.

Another exemplary method may place 768 the largest segment in the top left corner of the layout and then search for a segment with a size that can fit in the rest of the space on the right of the largest image. The next largest size segment is embedded below the largest one and one or more segments with a width fitting in the space to the right border of the layout are embedded, and method 700 can proceed until all segments are embedded or until there is no room to embed the next segment.

At the end of step 768 method 700 can increase 768 the counter CNT value by one and a decision is made 780 whether all the selected ROIs can be embedded in the layout and be displayed in a CP image or whether the value of the counter equal N1. If 780 the answer is negative, then method 700 can calculate the missing space size and accordingly scale down 782 one or more ROI, or scale down 782 all ROIs, for example. Then method 700 can return to step 768 and start a next cycle in the loop with smaller ROIs. If 780 there is place for all selected ROI, or the counter equal N1, then the loop is terminated and method 700 proceeds to step 784. N1 can be a configurable number in the range of 3-10, for example.

If 784 CNT value equals N1, then method 700 can select 786 a common layout that can fit the number of selected ROIs. If there are four images with ROI, then 2×2 layout can be selected and each segment can be in a quarter of the size of the layout, for example. Method 700 can define 786 the size and the location of the top-left pixel for each ROI in its associated segment and instructs 786 the editor 456 (FIG. 4) how to crop, scale and place that ROI in its associated segment. In other embodiments the all image can be displayed instead of the ROI.

If 784 CNT value does not equals N1, which means that in the last loop a layout that includes all the ROIs was found. According to the final layout, instruction to the editor 456 (FIG. 4) for building an adapted layout can be made. The instruction can define which decoded video image to get from the common interface 454, how to crop it (if needed), scale it (if needed) and where to place the cropped and scaled image in the layout. Next method 700 checks 790 if there are additional output modules (ports) 455a-c for defining their adapted layout. If 790 yes, then method 700 can return to step 760. If 790 not, then method 700 can return to step 706 FIG. 7a.

Some exemplary embodiments instead of using a loop (steps 760-790) may use a plurality of threads in parallel. Each thread can be associated with an output module.

In the present disclosure, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types can be implemented by a single processor. Software of a logical module can be embodied on a computer readable medium such as a read/write hard disc, CDROM, Flash memory, ROM, or other memory or storage, etc. In order to execute a certain task a software program can be loaded to an appropriate processor as needed.

In the description and claims of the present disclosure, "comprise," "include," "have," and conjugates thereof are used to indicate that the object or objects of the verb are not necessarily a complete listing of members, components, elements, or parts of the subject or subjects of the verb.

It will be appreciated that the above described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the discloser. The scope of the invention is limited only by the following claims and equivalents thereof.

The invention claimed is:

1. A video conferencing system, for adapting a continuous presence video image, comprising:
   a region of interest detector configured to detect a region of interest in video images generated by an endpoint of a plurality of endpoints;
   an editor module, configured to manipulate video images; and
   a control unit comprising a control module that performs actions comprising:
      designing a continuous presence layout based on parameters of the region of interest; and
      instructing the editor module how to manipulate at least one video image, and how to place the at least one manipulated video image in the continuous presence video image according to the continuous presence layout.

2. The video conferencing system of claim 1, wherein the control unit is a multipoint control unit.

3. The video conferencing system of claim 1, wherein instructing the editor module how to manipulate the at least one video image comprises instructing the editor module to crop or scale the video image.

4. The video conferencing system of claim 1, further comprising a video module that encodes the continuous presence video image and sends the encoded continuous presence video image toward a display unit of at least one of the plurality of endpoints.

5. The video conferencing system claim 1, wherein the region of interest detector comprises a face detector.

6. The video conferencing system claim 1, wherein the region of interest detector is associated with one of the plurality of endpoints.

7. The video conferencing system claim 1, wherein the continuous presence layout is designed based in part on a size of the region of interest.

8. The video conferencing system of claim 1, wherein the region of interest detector periodically captures a video frame generated by one of the plurality of endpoints to detect changes in the region of interest in the video image.

9. The video conferencing system of claim 8, wherein the continuous presence layout is periodically adjusted based on changes in the region of interest of at least one video image.

10. A method for adapting a video conferencing continuous presence layout, comprising:
   determining a region of interest in a video image generated by a transmitting endpoint of a plurality of transmitting endpoints;
   designing a continuous presence video image to be displayed at a receiving endpoint based at least in part on the region of interest;
   building the continuous presence video image from video images received from the plurality of transmitting endpoints; and
   delivering the continuous presence video image toward a display unit of the receiving endpoint.

11. The method of claim 10, wherein designing the continuous presence video image is based at least in part on management instructions, which are based at least in part on audio energy received from the plurality of transmitting endpoints.

12. The method of claim 10, wherein determining one or more regions of interest is executed based at least in part on data generated by a face detector.

13. The method of claim 10, wherein the continuous presence video image includes video images that have one or more regions of interest.

14. The method of claim 10, wherein designing a continuous presence video image is based at least in part on a size of the region of interest.

15. The method of claim 10, wherein determining a region of interest comprises capturing a video frame generated by the transmitting endpoint of the plurality of transmitting endpoints and determining the region of interest in the captured video frame.

16. The method of claim 10, wherein delivering the continuous presence video image comprises encoding the continuous presence video image and transmitting the encoded continuous presence video image toward the receiving endpoint.

17. The method of claim 10, wherein determining one or more regions of interest comprises periodically capturing a video frame transmitted by one of the transmitting endpoints and determining the region of interest in the captured video frame.

18. The method of claim 17, wherein designing a continuous presence video image comprises periodically adjusting the continuous presence video image based on the region of interest in the captured video frame.

19. The method of claim 18, wherein adjusting comprises changing a size of a received video image within the continuous presence video image.

20. The method of claim 18, wherein adjusting comprises eliminating a received video image from the continuous presence video image.

* * * * *